G. De NOTTBECK.
Reciprocating Churn.

No. 163,365. Patented May 18, 1875.

WITNESSES:
C. Neveux
A. F. Terry

INVENTOR:
Gabrielle De Nottbeck
BY
ATTORNEYS.

UNITED STATES PATENT OFFICE.

GABRIELLE DE NOTTBECK, OF NEW YORK, N. Y.

IMPROVEMENT IN RECIPROCATING CHURNS.

Specification forming part of Letters Patent No. 163,365, dated May 18, 1875; application filed April 17, 1875.

*To all whom it may concern:*

Be it known that I, GABRIELLE DE NOTTBECK, of New York city, in the county and State of New York, have invented a new and useful Improvement in Churns, of which the following is a specification:

My invention consists of utilizing the shaking and jarring motion of a railroad-car for producing the agitation of milk and cream for making butter, and to economize time by producing the butter while transporting it to market.

I provide a churn-box with a dasher suspended inside by a spring, so that the up-and-down motion of the cars will be so amplified in its effect on the cream as to readily convert it into butter, thus saving much time and labor.

Figure 1:
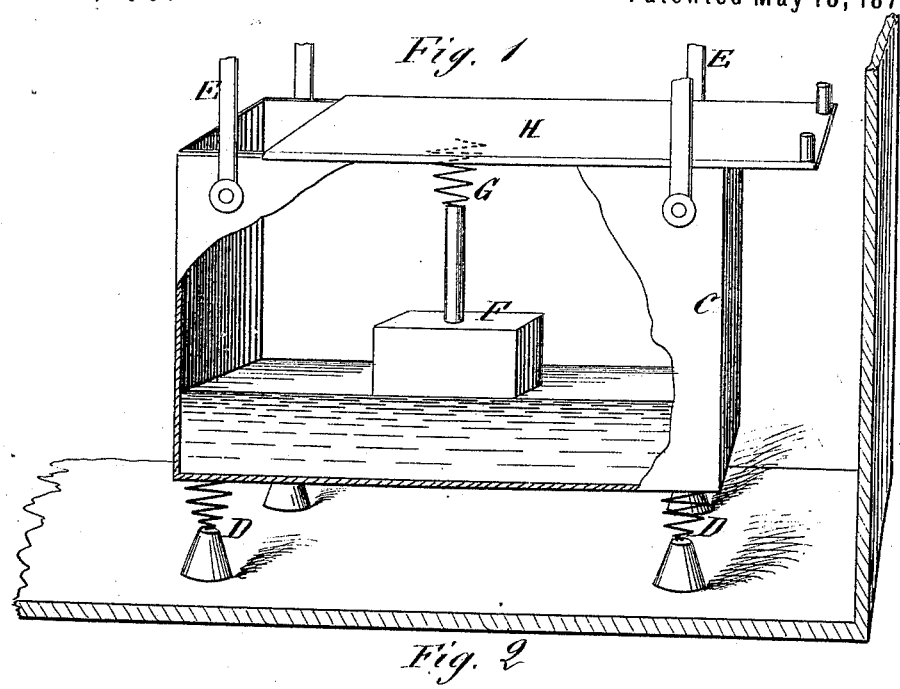
Figure 2:
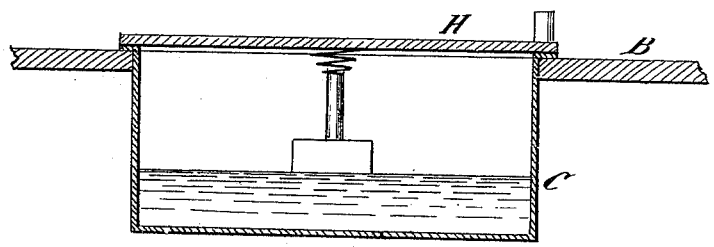
Figure 3:
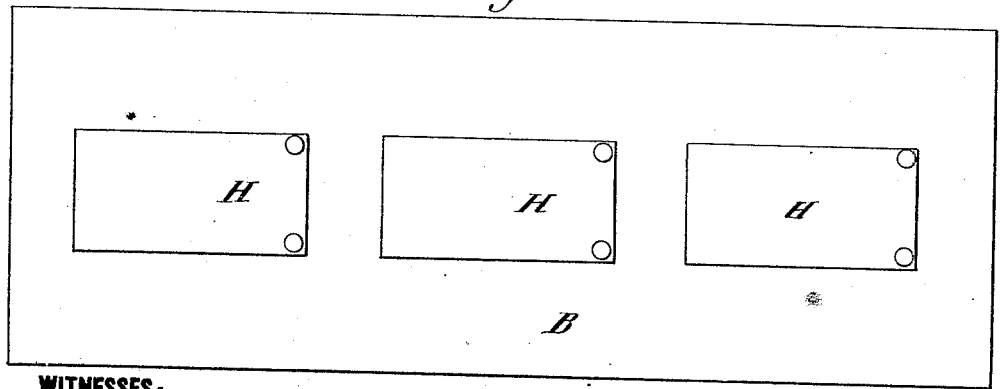

Figure 1 is a perspective and sectional view of a churn resting on and also suspended by springs in a car, and also containing a dasher suspended by a spring. Fig. 2 is a sectional elevation, showing the churn-box let down through the car-floor, flush with it; and Fig. 3 is a plan view of a car-floor having a series of churns so arranged.

Similar letters of reference indicate corresponding parts.

A represents the car-body, and B the floor. C is a box or case of any approved kind, constituting the body of the churn, which is to be mounted on springs D alone, or also suspended by springs D', or suspended only so that it will be effectually shaken by the motion of the car, and thereby will churn the cream into butter. F is a dasher, also to be suspended by a spring, G, for obtaining motion by the same means to churn the cream. H is a removable cover, affording access to the churn.

The churn may be placed on the floor, as in Fig. 1, or suspended in it, as in Fig. 2. In the latter case only the dasher will be mounted on a spring; but a considerable agitation will be produced by the car independently of the dasher.

Having thus described my invention, what I claim as new, and desire to secure by Letters Patent, is—

The combination of the dasher F and spring G with the churn-body C and cover H, as shown and described, to operate as specified.

GABRIELLE DE NOTTBECK.

Witnesses:
 JOHANNA SCHARSCHMIDT,
 THOMAS PRUDEN.